United States Patent
Takahashi et al.

(10) Patent No.: US 9,934,797 B2
(45) Date of Patent: Apr. 3, 2018

(54) MULTILAYER ELEMENT INCLUDING BASE MULTILAYER BODY, MAGNETIC SENSOR AND MICROWAVE ASSISTED MAGNETIC HEAD

(71) Applicant: TDK Corporation, Tokyo (JP)

(72) Inventors: Hirokazu Takahashi, Tokyo (JP); Tetsuya Roppongi, Tokyo (JP); Yoshikazu Soeno, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 15/138,347

(22) Filed: Apr. 26, 2016

(65) Prior Publication Data

US 2017/0309301 A1   Oct. 26, 2017

(51) Int. Cl.
*G11B 5/127* (2006.01)
*G11B 5/39* (2006.01)
*G11B 5/31* (2006.01)

(52) U.S. Cl.
CPC .......... *G11B 5/3912* (2013.01); *G11B 5/1278* (2013.01); *G11B 5/314* (2013.01); *G11B 5/3133* (2013.01)

(58) Field of Classification Search
CPC ...... G11B 5/1278; G11B 5/3133; G11B 5/314
USPC ...................................... 360/125.3
See application file for complete search history.

(56) References Cited

U.S. PATENT DOCUMENTS

| | | | |
|---|---|---|---|
| 6,511,761 B1* | 1/2003 | Tanahashi | C22C 27/06 360/97.11 |
| 6,730,420 B1* | 5/2004 | Bertero | G11B 5/66 427/131 |
| 8,184,411 B2 | 5/2012 | Zhang et al. | |
| 8,920,947 B2 | 12/2014 | Zhang et al. | |
| 2005/0255337 A1* | 11/2005 | Mukai | G11B 5/65 428/831 |
| 2009/0226765 A1* | 9/2009 | Kuboki | G11B 5/65 428/846.7 |
| 2009/0235983 A1* | 9/2009 | Girt | H01L 21/02488 136/258 |
| 2011/0279921 A1* | 11/2011 | Zhang | B82Y 10/00 360/59 |
| 2012/0113768 A1* | 5/2012 | Kanbe | G11B 5/6088 369/13.24 |
| 2013/0342285 A1* | 12/2013 | Kadota | H01G 7/06 333/188 |
| 2015/0049594 A1* | 2/2015 | Kanbe | G11B 5/65 369/13.24 |

(Continued)

FOREIGN PATENT DOCUMENTS

JP   2002-171011 A   6/2002
JP   5161951 B2   12/2012

*Primary Examiner* — Jefferson Evans
(74) *Attorney, Agent, or Firm* — Posz Law Group, PLC (57) ABSTRACT

A base multilayer body is made by laminating a seed layer and a buffer layer in respective order. The seed layer is an alloy layer containing tantalum (Ta) and at least one type of other metal, and having an amorphous structure or a microcrystal structure. The buffer layer is an alloy layer having a [001] plane orientation hexagonal close-packed structure and containing at least one type of a group VI metal and at least one type of a group IX metal in the periodic table. With this configuration, a magnetic layer providing a desired magnetic characteristic(s) can be laminated on the thinned base multilayer body.

11 Claims, 7 Drawing Sheets

(56) References Cited

U.S. PATENT DOCUMENTS

| | | | |
|---|---|---|---|
| 2015/0117166 A1* | 4/2015 | Zhang | G11B 5/65 369/13.5 |
| 2016/0172365 A1* | 6/2016 | McKinnon | H01L 28/40 365/145 |
| 2017/0256703 A1* | 9/2017 | Zhu | H01L 43/02 |

* cited by examiner

MULTILAYER ELEMENT INCLUDING BASE MULTILAYER BODY, MAGNETIC SENSOR AND MICROWAVE ASSISTED MAGNETIC HEAD

FIELD OF THE INVENTION

The present invention relates to a base multilayer body and a multilayer element including the base multilayer body, a magnetic sensor and a microwave assisted magnetic head.

BACKGROUND OF THE INVENTION

In the field of magnetic recording using heads and media, there is demand for further improvement in the performance of magnetic recording media and magnetic heads in association with the high recording density of a magnetic disk device.

The magnetic recording medium is a discontinuous medium where magnetic grains aggregate, and where each magnetic grain has a single magnetic domain structure. In the magnetic recording medium, one recording bit is configured of a plurality of magnetic grains. Consequently, in order to enhance the recording density, unevenness at the boundary of adjacent recording bits must be diminished by reducing the size of the magnetic grains. However, if size of the magnetic grains is reduced, the problem where the thermal stability of magnetization of the magnetic grains is reduced in association with the reduction of the volume of the magnetic grains.

As a countermeasure against this problem, an increase of uniaxial magnetic anisotropy energy Ku in the magnetic grains can be considered, but the increase of Ku causes an increase of a magnetic anisotropy field (coercive force) of the magnetic recording medium. In the meantime, the upper limit of the recording field intensity by the magnetic head is primarily determined according to saturation magnetic flux density of a soft magnetic material that configures a magnetic core within the head. Consequently, if the magnetic anisotropy field of the magnetic recording medium exceeds the tolerance value determined from the upper limit of the recording field intensity, it is impossible to record onto a magnetic recording medium.

At present, one method for solving the problem of thermal stability is energy assisted recording in which a magnetic recording medium formed with a magnetic material with large Ku is used. In this method, it is proposed to provide supplemental energy to the medium at the time of recording to effectively decrease the recording field intensity. The recording method which uses a microwave magnetic field as the supplemental energy source is referred to as microwave assisted magnetic recording (MAMR), and research and development are in progress for practical uses.

In the microwave assisted magnetic recording, the application of the microwave magnetic field in the medium in-plane direction of a frequency according to an effective magnetic field (Heff) relating to magnetization of a recording layer in the magnetic recording medium induces precession movement of the magnetization of the recording layer, and recording capability is assisted by a magnetic head.

As one example of the magnetic head using a microwave assisted magnetic recording method, a magnetic head is proposed that includes a main magnetic pole that generates a recording magnetic field for applying to the magnetic recording medium, a trailing shield, and a spin torque oscillator (STO) that is provided between them (write gap) and has a multilayered structure of a magnetic thin film. In the magnetic head, a microwave magnetic field in the in-plane direction is generated due to the self-excited oscillation of an STO, precession movement of the magnetization of the recording layer is induced by applying the microwave magnetic field to the magnetic recording medium, and magnetization reversal in the perpendicular direction in the recording layer is assisted.

In general, the STO has a multilayered structure where an under layer having a seed layer and a buffer layer, a spin injection layer (SIL), a spacer layer, a field generation layer (FGL) and a cap layer are laminated in respective order from the main magnetic pole side or the trailing shield side. In the STO, if a spin polarized current generated in the magnetic layer of the SIL is injected into the FGL, the magnetization of the FGL is oscillated using spin torque and microwave magnetic field is generated. The application of the microwave magnetic field to the magnetic recording medium redundantly with the recording field from the main magnetic pole enables reduction of the coercive force of the magnetic recording medium, and it becomes possible to record onto the magnetic recording medium.

The SIL requires high spin polarization and high perpendicular magnetic anisotropy, and as a magnetic material that can satisfy the requirements, for example, a $[CoFe/Ni]_n$ multilayered film is effective. Here, n indicates the number of repeated laminations of the lamination structure indicated within the bracket. Conventionally, STO using a $[CoFe/Ni]_n$ multilayered film as the SIL is proposed (U.S. Pat. No. 8,920,847). However, the perpendicular magnetic anisotropy of the SIL made from the $[CoFe/Ni]_n$ multilayered film is easily influenced by the crystal orientation or crystallinity of the multilayered film, with the problem that the perpendicular magnetic anisotropy of the SIL varies according to not only film formation conditions for the multilayered film, but also a constituent material of the under layer where the multilayered film is formed.

Further, in the microwave assisted magnetic head, the STO is provided in the write gap between the main magnetic pole and the trailing shield, and in order to accomplish high recording density, narrowing of the write gap, i.e., thinning of the STO provided in the write gap, is required.

In U.S. Pat. No. 8,920,847, a multilayer with tantalum (Ta) and copper (Cu) is disclosed as an under layer; however, if the under layer becomes thinner, it becomes difficult to form SIL having high perpendicular magnetic anisotropy, and the problem of narrowing of the write gap cannot be solved.

Consequently, the proposal of a new material in which a magnetic layer, such as SIL, having a desired magnetic characteristic(s), such as high perpendicular magnetic anisotropy can be laminated and an under layer can be configured to be thinner, is in demand.

SUMMARY OF THE INVENTION

The objective of the present invention is to provide a base multilayer body in which a magnetic layer providing a desired magnetic characteristic(s) can be laminated and which can be thinner, a multilayer element including the base multilayer body and a magnetic sensor and a microwave assisted magnetic head containing the multilayer element.

In order to accomplish the objective above, the present invention provides a base multilayer body in which a seed layer and a buffer layer are laminated in respective order, wherein the seed layer is an alloy layer that includes an amorphous structure or a microcrystal structure having tantalum (Ta) and at least one type of other metal; the buffer layer is an alloy layer that has a [001] plane orientation hexagonal close-packed structure and that contains at least one type of a group VI metal and at least one type of a group IX metal in the periodic table.

According to the invention above, a base multilayer body in which a magnetic layer providing a desired magnetic characteristic(s) can be laminated, and which can be thinner, can be provided.

In the invention above, it is preferable that the seed layer be an alloy layer containing tantalum (Ta) and at least one type of metal selected from a group of vanadium (V), titanium (Ti), chrome (Cr), manganese (Mn), iron (Fe), cobalt (Co), nickel (Ni) and copper (Cu). It is more preferable that the seed layer is an alloy layer containing tantalum (Ta) and iron (Fe), cobalt (Co) or nickel (Ni). It is particularly preferable that the seed layer be an alloy layer containing 60 at % or less of tantalum (Ta).

In the invention above, it is preferable that the buffer layer be an alloy layer containing chrome (Cr) as the group VI metal and rhodium (Rh) or iridium (Ir) as the group IX metal. It is more preferable that the buffer layer contains 30 at % or greater of the group VI metal(s) and 30 at % or greater of the group IX metal(s).

Further, the present invention provides a multilayer element including the base multilayer body relating to the invention above, a first ferromagnetic layer, a second ferromagnetic layer and a nonmagnetic spacer layer, wherein the first ferromagnetic layer, the nonmagnetic spacer layer and the second ferromagnetic layer are laminated on the buffer layer in respective order.

In the invention above, either the first ferromagnetic layer or the second ferromagnetic layer may be a spin injection layer, and the other may be a field generation layer; and either the first ferromagnetic layer or the second ferromagnetic layer may be a free layer in which its magnetization direction is changed according to an external magnetic field, and the other may be a pinned layer in which the magnetization direction is pinned.

In addition, the present invention provides a magnetic sensor that includes the multilayer element relating to the invention above.

Further, the present invention provides a microwave assisted magnetic head that includes a main magnetic pole that generates a recording magnetic field applied to a magnetic recording medium, a trailing shield that forms a magnetic path with the main magnetic pole, and the multilayer element relating to the invention above that is provided between the main magnetic pole and the trailing shield.

According to the present invention, provided are a base multilayer body in which a magnetic layer providing a desired magnetic characteristic(s) can be laminated and which can be thinner; a multilayer element including the base multilayer body; and a magnetic sensor and a microwave assisted magnetic head containing the multilayer element.

DETAILED DESCRIPTION OF THE INVENTION

Prior to explaining an embodiment of the present invention, terms used in the present specification are defined. In a lamination structure or an element structure formed on an element formation surface of a slider substrate in the microwave assisted magnetic head relating to the present embodiment, a substrate side viewed from a layer or an element to be referenced is referred to as "lower side," and its opposite side is referred to as "upper side." Further, an air bearing surface side viewed from the referenced layer or an element to be reference is referred to as "front side" and its opposite side is referred to as "back side" or "rear side." In addition, in the microwave assisted magnetic head relating to the present embodiment, "X-, Y- and Z-axis directions" are defined in some drawings as needed. Here, the Z-axis direction is the "vertical direction" as mentioned above, and +Z side is equivalent to the trailing side, and −Z side is equivalent to the leading side. Further, the Y-axis direction is the track width direction, and the X-axis direction is the height direction.

[Spin Torque Oscillator]

Figure 1A:
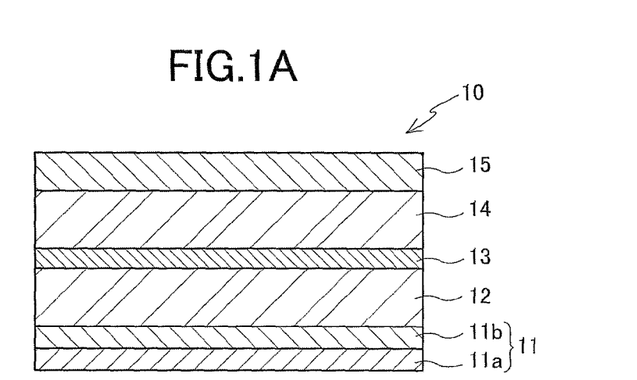
FIG. 1A is a cross-sectional view showing a schematic configuration of one mode of a spin torque oscillator (STO) including a base multilayer body relating to one embodiment of the present invention.

As shown in FIG. 1A, a spin torque oscillator (STO) 10 in the present embodiment is a multilayer element in which a base multilayer body 11 relating to the present embodiment, a spin injection layer (SIL) 12, a nonmagnetic spacer layer 13, a magnetic field generation layer (FGL) 14 and a cap layer 15 made from Ru or the like with a thickness of approximately 0.5 to 20 nm are laminated in respective order. In the STO 10, magnetization of the FGL 14 precessed by applying a direct current from the base multilayer body 11 side toward the cap layer 15 side, and a high-frequency magnetic field (microwave magnetic field) can be generated from the FGL 14.

The base multilayer body 11 relating to the present embodiment includes a seed layer 11a and a buffer layer 11b laminated over the seed layer 11a. The seed layer 11a and the buffer layer 11b are formed, for example, with a sputtering method or the like.

The seed layer 11a is an alloy layer having an amorphous structure or a microcrystal structure containing tantalum (Ta) and at least one more type of metal. As the other metal, 3d transition metal can be exemplified, and specifically, it is at least one type of metal to be selected from a group of vanadium (V), titanium (Ti), chrome (Cr), manganese (Mn), iron (Fe), nickel (Ni) and copper (Cu), and is preferably iron (Fe), cobalt (Co) or a nickel (Ni). If the seed layer 11a is configured by a single tantalum (Ta) body, because interatomic spacing of tantalum (Ta) configuring the seed layer 11a is too wide, it becomes difficult to form the buffer 11b with a thin film having desired crystal orientation and good crystallinity. However, because the seed layer 11a is an alloy layer having an amorphous structure or a microcrystal structure containing tantalum (Ta) and at least one type of other metal (3d transition metal), while the other metal (3d transition metal) fills the wide interatomic spacing of tantalum (Ta), the amorphous structure or the microcrystal structure can be maintained. Consequently, as it is clear from examples to be described later, a film thickness of the base multilayer body 11 can be thinner, and even if the film thickness of the base multilayer body 11 is thin, high perpendicular magnetic anisotropy can be induced to the SIL 12 to be laminated on the base multilayer body 11.

It is preferable that the seed layer 11a be an alloy layer containing 40 at % or greater of other metal(s), and it is more preferable that the seed layer 11a be an alloy layer containing 60 at % or greater. In other words, it is preferable that the seed layer 11a be an alloy layer containing 60 at % or less of tantalum (Ta), and it is more preferable that the seed layer 11a be an alloy layer containing 40 at % or less. Because the seed layer 11a contains 40 at % or more of other metal(s), even if the film thickness of the base multilayer body 11 is thin, high perpendicular magnetic anisotropy can be induced to the SIL 12.

It is preferable that a film thickness of the seed layer 11a be 0.4 nm to 5 nm, and it is more preferable that it be 0.8 nm to 3 nm. Even if the film thickness of the seed layer 11a is within the range above, the high perpendicular magnetic anisotropy can be induced to the SIL 12 laminated on the base multilayer body 11.

The buffer layer 11b is an alloy layer containing at least one type of group VI metal in the periodic table having a [001] plane orientation hexagonal close-packed structure, and at least one type of group IX metal in the periodic table. Because the buffer layer 11b is an alloy layer containing the group VI metal and the group IX metal, the buffer layer 11b can have the [001] plane orientation hexagonal close-packed structure, crystallinity and orientation of the SIL 12 laminated on the buffer layer 11b can be excellent, and a film exhibiting the orientation can be realized even it is a thin film.

As the group VI metals configuring the buffer layer 11b, for example, chrome (Cr), molybdenum (Mo), tungsten (W) and the like are exemplified, and as the group IX metals, for example, cobalt (Co), rhodium (Rh), iridium (Ir) and the like are exemplified. Out of these, the buffer layer 11b is preferably an alloy layer containing chrome (Cr) as the group VI metal and cobalt (Co), rhodium (Rh) or iridium (Ir) as the group IX metal.

The alloy layer configuring the buffer layer 11b preferably contains 30 at % or greater of the group VI metal, and more preferably contains 30 to 60 at %. Further, the alloy layer configuring the buffer layer 11b preferably contains 30 at % or greater of the group IX metal, and more preferably contains 40 to 70 at %. Because the buffer layer 11b is an alloy layer containing 30 at % or greater of the group VI metal and the group IX metal, the buffer layer 11b can have a hexagonal close-packed structure, crystallinity and orientation of the SIL 12 that is laminated on the buffer layer 11b can be excellent, and a film exhibiting the orientation can be realized even if it is a thin film.

The film thickness of the buffer layer 11b is preferably 0.4 nm to 5 nm, and is more preferably 0.8 nm to 3 nm. Even if the film thickness of the buffer layer 11b is within the range above, high perpendicular magnetic anisotropy can be induced to the SIL 12 that is laminated on the base multilayer body 11.

The film thickness of the base multilayer body 11 is preferably 0.8 nm to 10 nm, and is more preferably 1.6 nm to 6 nm. Even if the film thickness of the base multilayer body 11 is within the range above, high perpendicular magnetic anisotropy can be induced to the SIL 12 that is laminated on the base multilayer body 11.

Figure 1B:
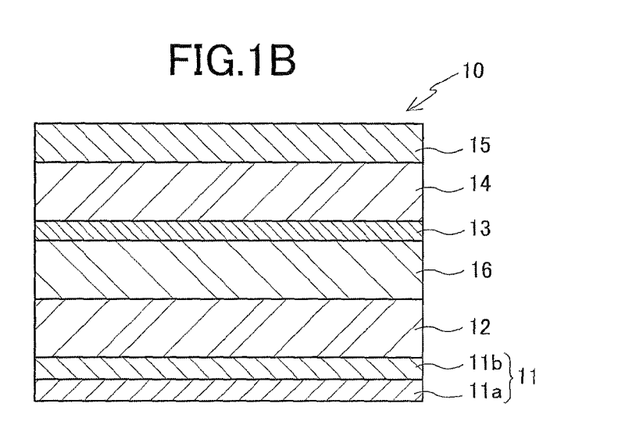
FIG. 1B is a cross-sectional view showing a schematic configuration of other mode of the STO.

The SIL 12 is a ferromagnetic layer having magnetic anisotropy in a perpendicular direction (perpendicular magnetic anisotropy) relative to a film surface, and is configured by a multilayer film of magnetic bodies, such as $[CoFe/Ni]_n$, $[Co/Pt]_n$ or $[Co/Pd]_n$, or a multilayer film of a magnetic body and a nonmagnetic body. Furthermore, "n" is the number of repeated laminations of the lamination structure indicated within the bracket. Further, as materials configuring the SIL 12, an alloy having the perpendicular magnetic anisotropy, such as CoPt, FePt or MnGa, is usable as well. When the SIL 12 is configured by $[CoFe/Ni]_n$, it is preferable that the film thickness of Ni be the same or thicker than that of CoFe. The film thickness of CoFe is preferably 0.1 nm to 1 nm, and is more preferably 0.1 nm to 0.4 nm. The film thickness of Ni is preferably 0.2 nm to 1.5 nm, and is more preferably 0.2 nm to 0.6 nm. The number of repeated laminations n in the lamination structure is preferably 2 to 40, and is more preferably 2 to 20. The SIL 12 is a layer to spin-polarize electrons by applying a current in the lamination direction of the STO 10, and to inject the electrons to the FGL 14. The film thickness of the SIL 12 is preferably 0.6 nm to 15 nm, and is more preferably 1 nm to 10 nm. In order to increase a spin polarization by the SIL 12, as shown in FIG. 1B, a magnetic body layer 16 with a higher spin polarization may exist between the SIL 12 and a nonmagnetic spacer layer 13. In particular, if the SIL 12 is configured by $[CoFe/Ni]_n$, it is preferable to have a magnetic body layer 16 because it contains Ni with a small spin polarization. As a material configuring such magnetic body layer 16, soft magnetic alloys, such as CoFe or CoFeB, Co-based heusler alloys, such as $Co_2MnSi$ or $Co_2FeSi$, materials having negative spin polarization, such as FeCr or FeV, and the like can be exemplified. The film thickness of the magnetic body layer 16 is preferably 0.1 nm to 8 nm, and more preferably 0.4 nm to 4 nm.

The nonmagnetic spacer layer 13 may be configured by a nonmagnetic metal with high spin permeability, such as Cu, Ag, Au, Cr or Al, or may be a tunnel barrier layer, such as an MgO layer or an $Al_2O_3$ layer. The film thickness of the nonmagnetic spacer layer 13 is set, for example, at approximately 0.5 nm to 5 nm, and can be preferably set at approximately 1.5 nm to 3 nm. Because the film thickness of the nonmagnetic spacer layer 13 is within the range above, an exchange coupling between the SIL 12 and the magnetic field layer 14 can be optimally adjusted.

The FGL 14 is a ferromagnetic layer made from a material where its direction of magnetization under an initial condition (a condition where no current flows and no magnetic field is applied) is nearly parallel with the film surface. Since the saturation magnetization Ms (emu/cm$^3$) of the FGL 14 becomes greater and the film thickness becomes thicker, the intensity of the microwave magnetic field to be generated is increased; thus, it is preferable that the FGL 14 is made from a material with greater saturation magnetization Ms, and if the STO 10 is used as a recording element in the recording head 1B of the microwave assisted magnetic head 1 (see FIGS. 3 to 6), it is preferable to have a film thickness within a predetermined range to be accommodated in the write gap (a gap between the main magnetic pole layer 6 and the trailing shield 7 (see FIG. 6)). As the constituent material of the FGL 14, for example, soft magnetic materials, such as [FeCo/Ni]$_m$, FeCo, FeCoAl, FeCoSi, FeCoB or FeNi, and CoIr having negative perpendicular magnetic anisotropy, such as [Fe/Co]$_m$, are exemplified. Furthermore, "m" is the number of repeated laminations of the lamination structure indicated within the bracket. If [FeCo/Ni]$_m$ is used as a constituent material of the FGL 14, it is preferable that the film thickness of the FeCo is thicker than that of Ni. The film thickness of FeCo is preferably 0.4 nm to 4 nm, and is more preferably 0.8 nm to 2 nm. The film thickness of Ni is preferably 0.1 nm to 1 nm, and is more preferably 0.1 nm to 0.5 nm. The number of repeated laminations m of the lamination structure is preferably 1 to 20, and is more preferably 3 to 10. The film thickness of the FGL 14 is approximately 2 nm to 20 nm, and is more preferably 5 nm to 15 nm.

In the STO 10 in the present embodiment, when a direct current is applied in the lamination direction (from the base multilayer body 11 side to the cap layer 15 side), electrons are spin-polarized due to magnetization of the SIL 12. If the spin polarization of the SIL 12 is positive, spin electrons that have been polarized in a direction opposite to the majority spin of the SIL 12 are reflected at the SIL 12, and are injected into the FGL 14. The reflected spin electrons function so as to counteract dumping of the magnetization of the FGL 14 due to an external magnetic field, the precession movement of the magnetization of the FGL 14 is induced, and a microwave magnetic field is generated from the FGL 14.

In the meantime, in the STO 10 in the present embodiment, a direct current may be applied from the cap layer 15 side toward the base multilayer body 11 side. In this mode, the mechanism of action to generate the microwave magnetic field is mentioned below.

The spin electrons are injected into the FGL 14 from the SIL 12. Many of the spin electrons are spin electrons that are polarized in a direction that is the same as the majority spin of the SIL 12. Since the spin electrons accelerate the dumping of the magnetization of the FGL 14, the precession movement cannot be induced. However, in actuality, the spin electrons that have been polarized in a direction opposite to the majority spin of the SIL 12 are slightly injected into the FGL 14. These spin electrons polarized in the opposite direction are reflected at the FGL 14 and injected into the SIL 12, and the magnetization of the SIL 12 is reversed. As a result, the polarization direction of the spin electronics to be injected into the FGL 14 from the SIL 12 is reversed. These spin electrons function so as to counteract the dumping of the magnetization of the FGL 14, the precession movement of the magnetization of the FGL 14 is induced, and a microwave magnetic field is generated from the FGL 14. In this mode, in order to induce the precession movement of the magnetization of the FGL 14, it is necessary to reverse the magnetization of the SIL 12, but if the perpendicular magnetic anisotropy of the SIL 12 is excessively great, it becomes difficult to reverse the magnetization of the SIL 12. Then, in the STO 10 in this mode, as shown in FIG. 1B, the magnetic body layer 16 intervenes between the SIL 12 and the nonmagnetic spacer layer 13, and the film thickness of the magnetic body layer 16 is appropriately adjusted. When the perpendicular magnetic anisotropy of the magnetic body layer 16 is smaller than that of the SIL 12, because the magnetization of the magnetic body layer 16 is easily reversed, the magnetization reversal of the SIL 12 can be accelerated as a result. Thus, the magnetization of the SIL 12 is reversed, and the precession movement of the magnetization of the FGL 14 can be induced.

The STO 10 having the configuration above can be used as a recording element, for example, in the recording head 1B of the microwave assisted magnetic head 1 (see FIGS. 3 to 6) to be described later. In such a recording head 1B, signals can be recorded in a magnetic recording medium 100 with greater uniaxial magnetic anisotropy energy Ku by superimposing the microwave magnetic field from the FGL 14 onto the recording field from the main magnetic pole layer 6 (see FIG. 6).

Further, the STO 10 in the present embodiment can be used as a magnetic sensor by using a resistance change depending upon an external magnetic field, and more specifically can be used as a reproducing element in the reproducing head 1A of the thin film magnetic head, such as the microwave assisted magnetic head 1 (see FIGS. 3 to 6). In the reproducing head 1A of such a microwave assisted magnetic head 1, the reproducing element is provided between an upper shield layer 5 and a lower shield layer 3, and, for example, in the microwave assisted magnetic head 1 shown in FIG. 6, an MR element 4 as the reproducing element is provided. Instead of the MR element 4, the STO 10 in the present embodiment can be used as the reproducing element above. As described above, when a direct current is applied in the lamination direction of the STO 10, the precession movement of the magnetization of the FGL 14 is induced, and the magnetization of the FGL 14 constantly oscillates. If the magnetization of the FGL 14 is in the oscillation state, a relative angle between the magnetization of the FGL 14 and that of the SIL 12 is changed every second. The change in the relative angle between those magnetizations causes a change in the resistance of the STO 10 due to a magnetoresistive effect. In other words, the resistance of the STO 10 varies according to the change in the relative angle between the magnetization of the FGL 14 and that of the SIL 12. As a result, an alternating-current component is generated in the voltage between the upper shield layer 5 and the lower shield layer 3. The alternating-current component of the voltage is extracted by a high-frequency circuit (illustration is omitted), and the high-frequency voltage is obtained. The frequency of the high-frequency voltage depends upon a magnetic field from the magnetic recording medium 100. Therefore, information recorded in the magnetic recording medium 100 can be read by detecting the frequency of the high-frequency voltage output from the STO 10.

In the STO 10 in the present embodiment, the seed layer 11a configuring the base multilayer body 11 is an alloy layer having an amorphous structure or a microcrystal structure containing tantalum (Ta) and at least one type of the other metal, the buffer layer 11b is an alloy layer containing the group VI metal and the group IX metal in the periodic table, and because of having a [001] plane orientation hexagonal close-packed structure, even if the film thickness of the base multilayer body 11 is thin, high perpendicular magnetic anisotropy can be induced to the SIL 12. Therefore, according to the STO 10 in the present embodiment, total film thickness (total film thickness from the seed layer 11a to the cap layer 15) can be extremely thin, and a superior magnetic characteristics can be provided.

Figure 5:
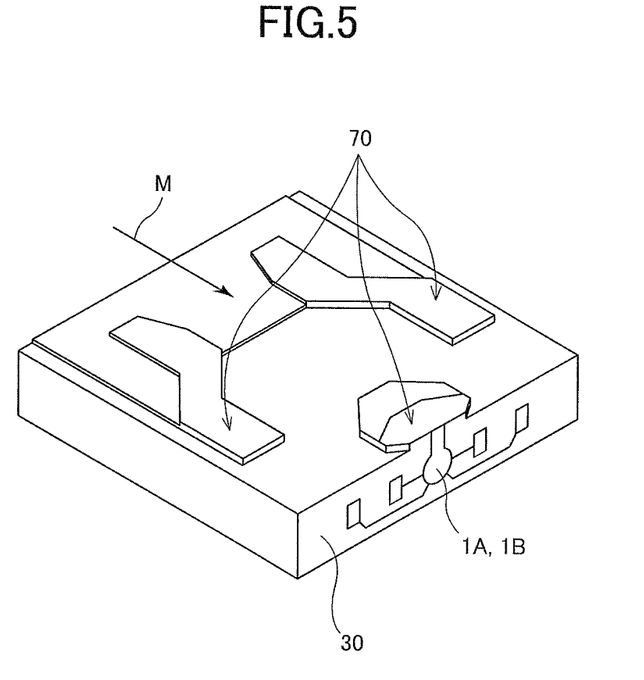
FIG. 5 is a perspective view showing an entire structure of a microwave assisted magnetic head in a pattern manner in one embodiment of the present invention.
Figure 6:
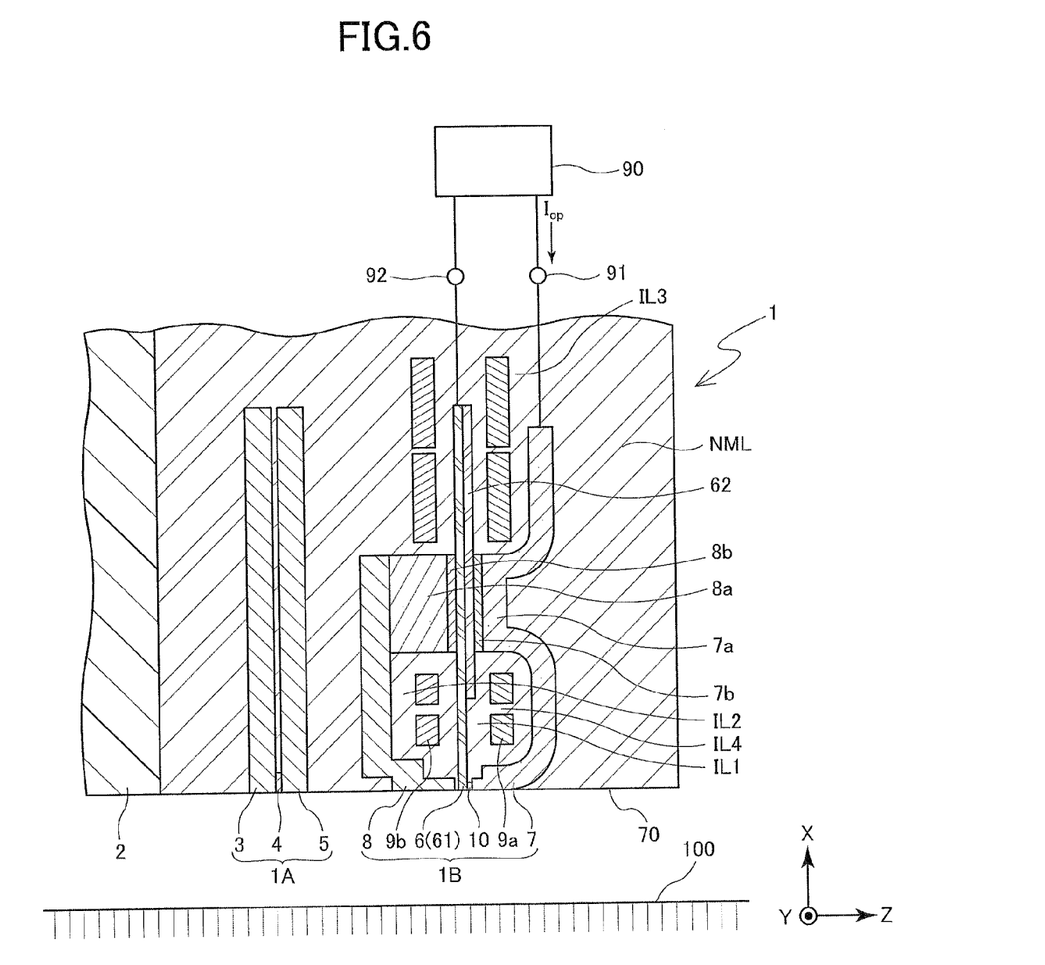
FIG. 6 is a cross-sectional view (XZ plane) schematically showing a configuration of the main portion of the microwave assisted magnetic head in one embodiment of the present invention.

The gap (write gap) between the main magnetic pole layer 6 and the trailing shield 7 in the recording head 1B of the microwave assisted magnetic head 1 (see FIGS. 3 to 6) is desirably as narrow as possible in order to accomplish high recording density (see FIG. 6). In the STO 10 in the present embodiment, the film thickness of the base multilayer body 11 can be thin while the superior magnetic characteristic(s) is provided, and the total film thickness of the STO 10 can be thin, so the high recording density can be accomplished by using the STO 10 as a recording element in the recording head 1B of the microwave assisted magnetic head 1.

Further, in the reproducing element (MR element 4) that is provided in the gap (read gap) between the upper shield layer 5 and the lower shield layer 3 in the reproducing head 1A of the thin film magnetic head, such as the microwave assisted magnetic head 1 (see FIGS. 3 to 6), if not only a magnetic field from a bit that is subject to reading information in a magnetic recording medium but a magnetic field from a bit adjacent to the bit also function, recorded signals cannot be accurately read. In order to suppress interference (magnetic interference) by the adjacent bit and to realize high resolution, it is effective to narrow the gap (read gap) between the upper shield layer 5 and the lower shield layer 3 as much as possible. In the STO 10 in the present embodiment, while a superior reading characteristic(s) is provided, the film thickness of the base multilayer body 11 can be thin, and the total film thickness of the STO 10 can be thin. Consequently, signals can be read at the high resolution by using the STO 10 instead of the MR element 4 as a reproducing element in the reproducing head 1A of the thin film magnetic head, such as the microwave assisted magnetic head 1.

[Magnetoresistive Effect Element]

Figure 2:
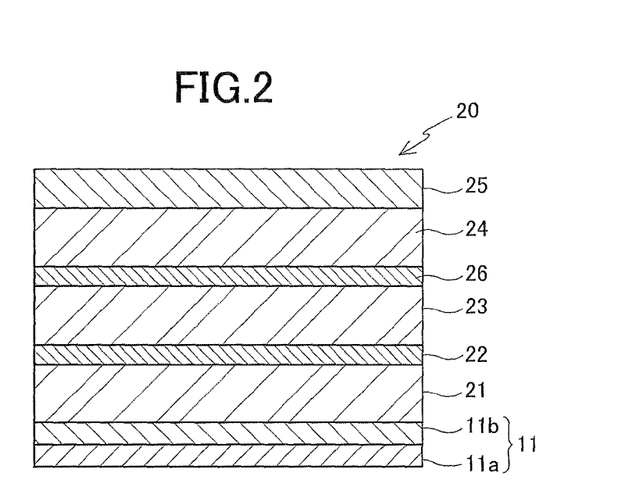
FIG. 2 is a cross-sectional view showing a schematic configuration of a magnetoresistive effect element (MR element) including the base multilayer body relating to one embodiment of the present invention.

As shown in FIG. 2, a magnetoresistive effect element (MR element) 20 includes the base multilayer body 11, a free layer 21 where a direction of its magnetization varies according to an external magnetic field, a nonmagnetic spacer layer 22, a reference layer 23 and a pinned layer 24 where directions of their magnetization are pinned, and a cap layer 25 made from Ru or the like with a film thickness of approximately 0.4 nm to 20 nm, is a multilayer element where the free layer 21, the nonmagnetic spacer layer 22, the reference layer 23, the pinned layer 24 and the cap layer 25 are laminated on the buffer layer 11B of the base multilayer body 11 in respective order, and has a current perpendicular-to-plane (CPP) structure in which a sense current is applied in the lamination direction.

The base multilayer body 11 in the magnetoresistive effect element (MR element) 20 has the same configuration as the base multilayer body 11 in the STO 10 (see FIG. 1).

As a material configuring the free layer 21, soft magnetic materials, such as CoFe, NiFe, CoFeB, CoFeSiB, CoFeHf, CoFeAl or CoFeTaB, and Co-based heusler alloys, such as $Co_2FeSi$ or $Co_2MnSi$, can be exemplified, and the free layer 21 has a single layer structure or a lamination structure made from these materials. As a material configuring the reference layer 23, soft magnetic materials, such as CoFe or CoFeB, and Co-based heusler alloys, such as $Co_2FeSi$ or $Co_2MnSi$, can be exemplified, and the reference layer 23 has a single layer structure or a lamination structure made from these materials. As a material configuring the pinned layer 24, CoFe, CoFeB, IrMn and the like can be exemplified, and the pinned layer 24 has a lamination structure of IrMn with CoFe, CoFeB or the like. The thicknesses of the free layer 21, the reference layer 23 and the pinned layer 24 can be set to be approximately 1 nm to 20 nm, respectively.

The nonmagnetic metal layer 26, such as Ru, is provided between the reference layer 23 and the pinned layer 24, and a magnetic pinned layer is configured with the lamination structure of the reference layer 23/the nonmagnetic metal layer 26/the pinned layer 24. Because of such a lamination structure, strong exchange coupling can be provided between the reference layer 23 and the pinned layer 24, and the influence by a static magnetic field generated from the reference layer 23 to the free layer 21 can also be reduced.

The magnetization direction of the reference layer 23 is pinned by providing unidirectional anisotropy energy (referred to as "exchange bias" or "coupling magnetic field", as well) to the reference layer 23 by exchange coupling with the pinned layer 24, which contains an antiferromagnetic layer. The magnetization direction of the free layer 21 and that of the reference layer 23 is substantially orthogonal in the initial state.

The nonmagnetic spacer layer 22 is an essential film for developing a magnetoresistive effect (MR effect) in the magnetoresistive effect element (MR element) 20 in the present embodiment. The nonmagnetic spacer layer 22 may be configured by a nonmagnetic metal, such as Cu, Au, Ag, Cr or Al, and may be a tunnel barrier layer, such as an MgO layer or an $Al_2O_3$ layer. Furthermore, the film thickness of the nonmagnetic spacer layer 22 can be set to approximately 0.4 nm to 5 nm.

The magnetoresistive effect element (MR element) in the present embodiment 20 can be used as a magnetic sensor by utilizing a change in resistance depending upon an external magnetic field, specifically as a reproducing element in the reproducing head 1A of the thin film magnetic head, such as the microwave assisted magnetic head 1 (see FIGS. 3 to 6) to be described later. In this case, the magnetoresistive effect element (MR element) 20 in the present embodiment is provided as the MR element 4 in the gap (read gap) between the upper shield layer 5 and the lower shield layer 3 having a function as a magnetic shield from an external magnetic field and another function as an electrode when a sense current is applied to the magnetoresistive effect element (MR element) 20 (see FIG. 6). The magnetoresistive effect element (MR element) 20 in the present embodiment can reduce the film thickness of the base multilayer body 11 while providing superior reading characteristics, and can reduce the total film thickness of the magnetoresistive effect element (MR element) 20. Therefore, signals can be read with high resolution by using the magnetoresistive effect element (MR element) 20 as a reproducing element in the reproducing head of the thin film magnetic head.

[Magnetic Recording Apparatus]

Figure 3:
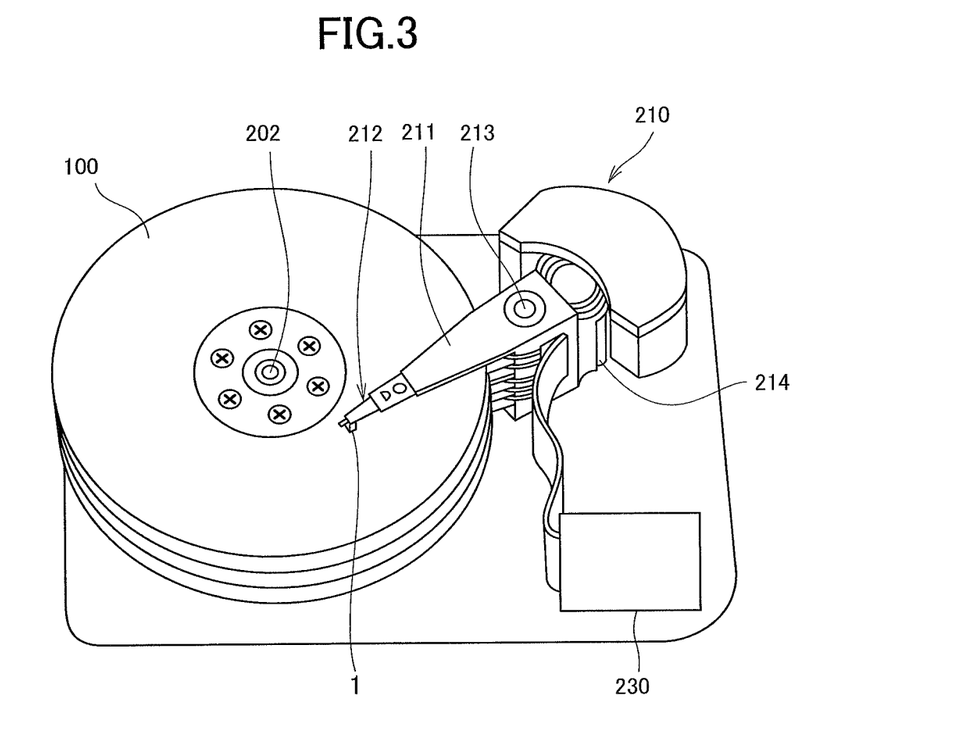
FIG. 3 is a perspective view schematically showing a magnetic recording apparatus in one embodiment of the present invention.
Figure 4:
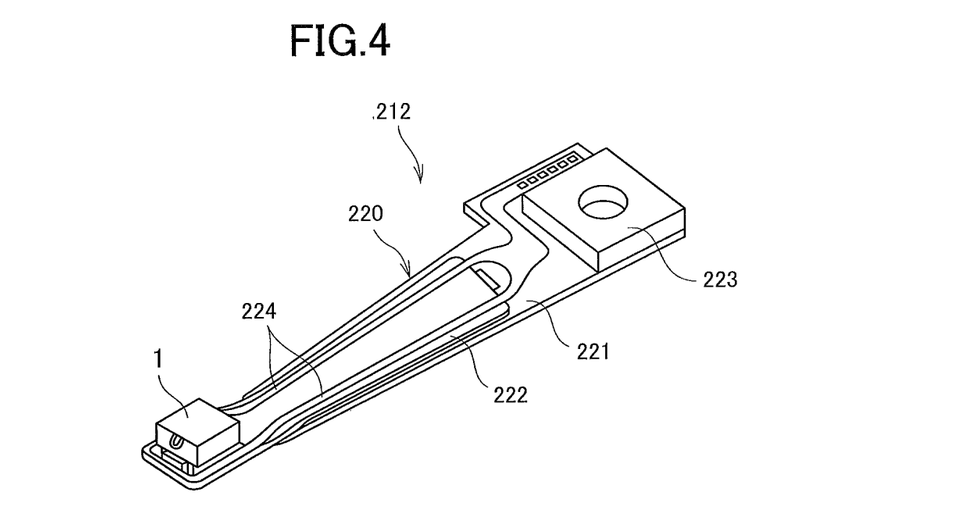
FIG. 4 is a perspective view schematically showing a head gimbal assembly (HGA) in one embodiment of the present invention.

FIG. 3 is a perspective view schematically showing a magnetic recording apparatus where the microwave assisted magnetic head in the present embodiment is mounted, FIG. 4 is a perspective view schematically showing a head gimbal assembly (HGA) that includes the microwave assisted magnetic head in the present embodiment, and FIG. 5 is a perspective view showing an entire configuration of the microwave assisted magnetic head in the present embodiment in a pattern manner.

As shown in FIG. 3, the magnetic recording apparatus in the present embodiment includes a plurality of magnetic disks 100 that rotate around a rotation axis of a spindle motor 202, respectively, an assembly carriage device 210 where a plurality of drive arms 211 are provided, head gimbal assemblies (HGA) 212 that are mounted at the front end portions of the drive arms and that have the microwave assisted magnetic head 1, respectively, and a control circuit 230 that controls writing and reading actions of the microwave assisted magnetic head 1.

In the present embodiment, the magnetic disk 100 as a magnetic recording medium is for perpendicular magnetic recording and has a structure where a soft magnetic under layer, an intermediate layer, a magnetic recording layer (perpendicular magnetization layer) and the like are laminated in respective order, for example, on a disk substrate.

The assembly carriage device 210 is a device for positioning the microwave assisted magnetic head 1 on a track where recording bits of the magnetic disk 100 are aligned. In the assembly carriage device 210, the drive arms 211 are stacked in the direction along a pivot bearing shaft 213 and are configured to be angularly swingable centering on the pivot bearing shaft 213 by a voice coil motor (VCM) 214.

Furthermore, the structure of the magnetic recording apparatus in the present embodiment is not limited to the structure mentioned above, but the magnetic disk 100, the drive arm 211, the HGA 212 and the microwave assisted magnetic head 1 may be singular, respectively.

In the HGA 212 shown in FIG. 4, a suspension 220 has a load beam 221, a flexure 222 that is attached to the load beam 221 and that has elasticity and a base plate 223 provided in a base of the load beam 221. Further, a wiring member 224 including a lead conductor and connection pads that are electrically connected to both ends of the lead conductor is provided on the flexure 222. A magnetic head slider 30 (see FIG. 5) that includes the microwave assisted magnetic head 1 in the present embodiment is attached to the flexure 222 at the front end portion of the suspension 220 so as to oppose the surfaces of the magnetic disks at a predetermined space (flying height).

In addition, one end of the wiring member 224 is electrically connected to a terminal electrode of the microwave assisted magnetic head 1 in the present embodiment. Furthermore, the structure of the suspension 220 in the present embodiment is also not limited to the structure above.

As shown in FIG. 5, the magnetic head slider 30 has an air bearing surface (ABS) 70 that is directly involved with the flying characteristics, and includes the microwave assisted magnetic head 1 at a side surface end (side surface end at the back side) of the traveling direction M of the magnetic disk 100 (the same direction as air flow). The microwave assisted magnetic head 1 includes the recording head 1B and the reproducing head 1A.

[Microwave Assisted Magnetic Head]

Next, the microwave assisted magnetic head in the present embodiment is explained with reference to the drawings. FIG. 6 is a cross-sectional view (XZ cross-sectional view) along a direction that crosses the ABS, which is an air bearing surface, of the microwave assisted magnetic head in the present embodiment.

As shown in FIG. 6, the microwave assisted magnetic head 1 in the present embodiment has a slider substrate 2, and the reproducing head 1A and the recording head 1B laminated on an element formation surface of the slider substrate 2. Further, the microwave assisted magnetic head 1 has the ABS 70, which is an air bearing surface opposite to the magnetic disk 100.

The reproducing head 1A has the MR element 4 that is arranged in the vicinity of the ABS 70 for detecting a signal magnetic field from the magnetic disk 100, and the lower shield layer 3 and the upper shield layer 5 that are formed on the element formation surface of the slider substrate 2 and are made from a magnetic material.

The lower shield layer 3 and the upper shield layer 5 are provided for the purpose of preventing the MR element 4 from receiving an external magnetic field that is noise. The lower shield layer 3 and the upper shield layer 5 are magnetic layers that are formed, for example, using a frame plating method, a sputtering method or the like, and that are made from a magnetic material. The lower shield layer 3 and the upper shield layer 5 are made from soft magnetic materials such as, for example, NiFe (permalloy), FeSiAl (Sendust), CoFeNi, CoFe, FeN, FeZrN, CoZrTaCr or the like, or multilayer films of these materials or the like. The thicknesses of the lower shield layer 3 and the upper shield layer 5 are, for example, approximately 0.1 µm to 3 µm, respectively.

The MR element 4 is a magnetic sensor that detects a signal magnetic field by utilizing the MR elements, and for example may be any of a Current In Plane-Giant Magneto-Resistive (CIP-GMR) multilayer utilizing an in-plane current-passage type giant magnetoresistive effect, a Current Perpendicular to Plane-Giant Magneto-Resistive (CPP-GMR) multilayer by utilizing a perpendicular current-passage type giant magnetoresistive effect and a Tunneling Magneto-Resistive (TMR) multilayer by utilizing a tunnel magnetoresistive effect.

The MR element 4 utilizing these MR effects can detect a signal magnetic field from the magnetic disk 100 with a high sensitivity. Furthermore, if the MR element 4 is a CPP-GMR multilayer or a TMR multilayer, the lower shield layer 3 and the upper shield layer 5 can fulfill a role as an electrode as well. In the meantime, if the MR element 4 is the CIP-GMR multilayer, insulating layers are provided between the MR element 4 and the lower shield layer 3, and between the MR element 4 and the upper shield layer 4, and an MR lead layer that is electrically connected to the MR element 4 is further provided.

It is preferable to use the magnetoresistive effect element (MR element) 20 (see FIG. 2) including the base multilayer body 11 relating to the present embodiment as the MR element 4. Further, it is also preferable to use the STO 10 (see FIG. 1) including the base multilayer body 11 relating to the present invention instead of the MR element 4. The gap (read gap) between the upper shield layer 5 and the lower shield layer 3 can be narrowed by using these MR element 20 and STO 10 as reproducing elements in the reproducing head 1A, and it becomes possible to read information at high resolution.

The recording head 1B is for perpendicular magnetic recording, and has the magnetic pole layer 6, the trailing shield 7, the leading shield 8, the STO 10 positioned in the gap (write gap) between the main magnetic pole layer 6 and the trailing shield 7, and a first coil 9a and a second coil 9b.

The main magnetic pole layer 6 configures a magnetic guide path for guiding magnetic flux, which has been generated by applying a writing current to the first coil 9a and the second coil 9b, while focusing the magnetic flux to a magnetic recording layer (perpendicular magnetic layer) of the magnetic disk to be written.

The main magnetic pole layer 6 extends rearwardly in the height direction from the ABS 70, and includes a main magnetic pole part 61 and an auxiliary magnetic pole part 62. The main magnetic pole part 61 and the auxiliary magnetic pole part 62 can be arranged upside down (Z direction) depending upon the design specifications.

The auxiliary magnetic pole part 62 extends toward the height direction from a recessed position from the ABS 70.

Figure 7:
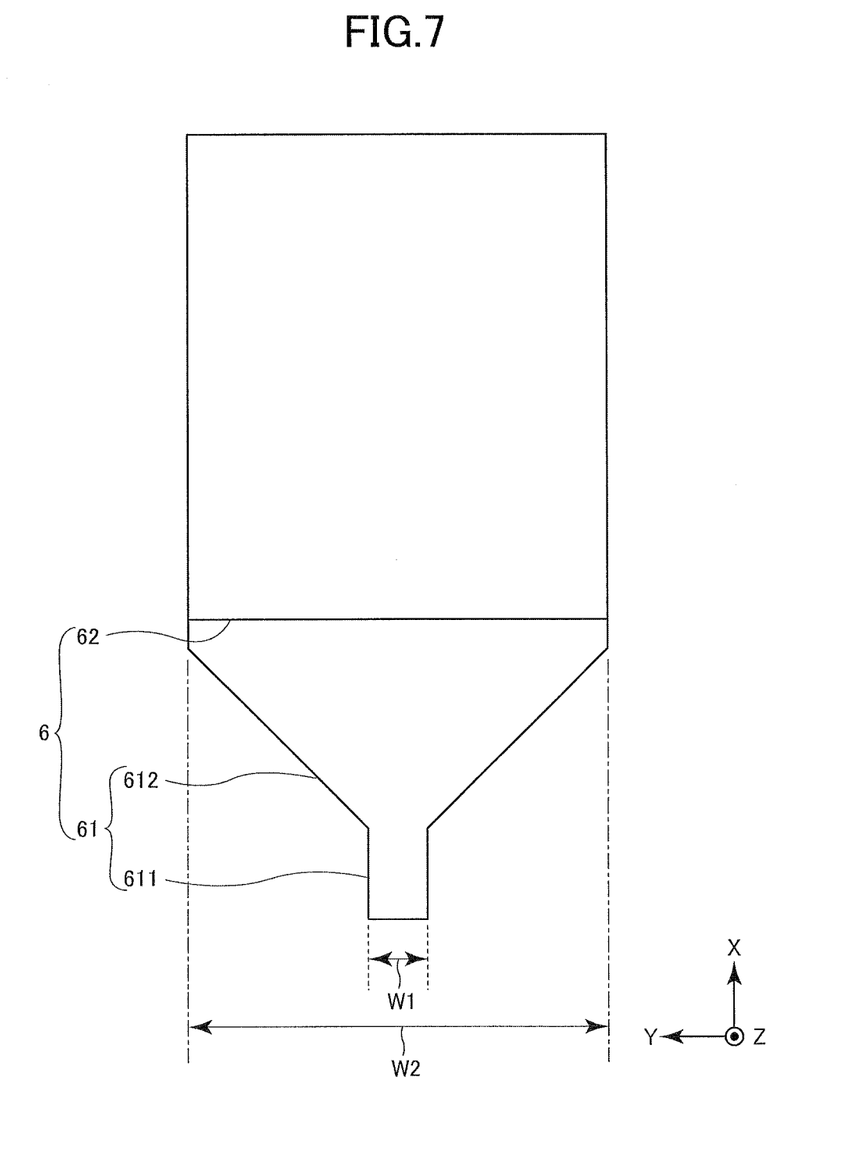
FIG. 7 is a plan view schematically showing a main magnetic pole layer in a recording head of the microwave assisted magnetic head in one embodiment of the present invention.

This auxiliary magnetic pole part 62 is arranged, for example, at the leading side relative to the main magnetic pole part 61, and as shown in FIG. 7, has a rectangular type plane shape (width W2). The auxiliary magnetic pole part 62, as described above, may be arranged at the trailing side of the main magnetic pole part 61.

The main magnetic pole part 61 extends rearwardly in the height direction from the ABS 70. This main magnetic pole part 61, for example, as shown in FIG. 7, includes a first magnetic pole part 611 that extends rearwardly in the height direction from the ABS 70 and that has a narrow width, and a second magnetic pole part 612 that continues to the back side of the first magnetic pole part 611 and that has a wide width.

The first magnetic pole part 611 is a part where a magnetic flux is substantially emitted, and has a constant width W1 to regulate the recording track width. The second magnetic pole part 612 is a part that supplies a magnetic flux to the first magnetic pole part 611, and has a wider width W2 than the width W1 of the first magnetic pole part 611. The width W2 of the second magnetic pole part 612 becomes gradually narrower toward the first magnetic pole part 611 at the front side in the height direction. Because the first magnetic pole 611 has a smaller width W1, it becomes possible to generate a minute writing magnetic field, and it becomes possible to set the track width to a minute value corresponding to high recording density.

Figure 8:
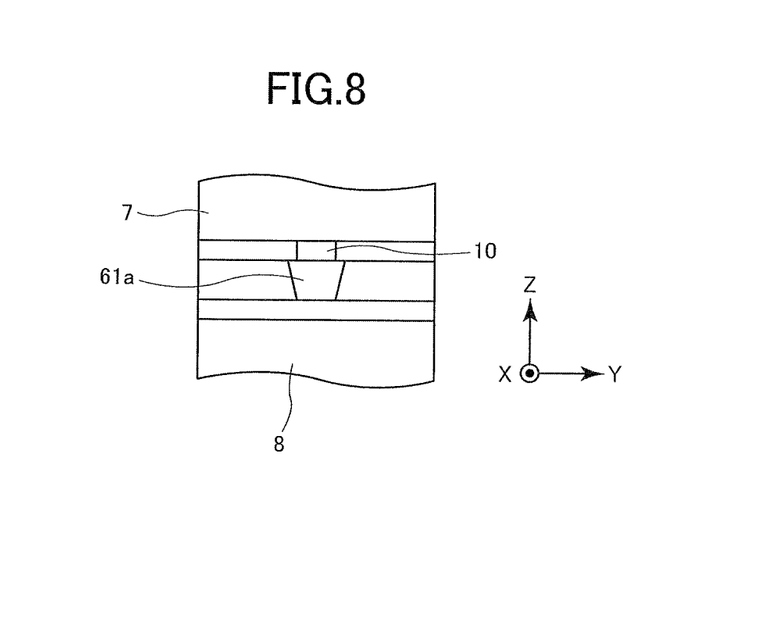
FIG. 8 is a plan view showing a schematic configuration of the recording head of the microwave assisted magnetic head in one embodiment of the present invention viewed from the ABS side.

The main magnetic pole part 61, on the ABS 70, for example, has a so-called inverted trapezoid-shaped end surface 61a where its upper edge side (+Z side) is wider than its lower edge side (−Z side) and its width becomes narrower toward the lower direction (−Z direction) (see FIG. 8).

The main magnetic pole 6 (the main magnetic pole part 61 and the auxiliary magnetic pole part 62) is configured by a soft magnetic material having high saturation magnetic flux density. For example, it can be configured by a soft magnetic material, which is an iron-based alloy material (such as FeNi, FeCo, FeCoNi, FeN or FeZrN). The main magnetic pole part 61 and the auxiliary magnetic pole part 62 can be separate bodies, and they may be configured by different soft magnetic materials, respectively. For example, the main magnetic pole part 61 can be configured by a soft magnetic material having higher saturation magnetic flux density than the auxiliary magnetic pole part 62.

Figure 9:
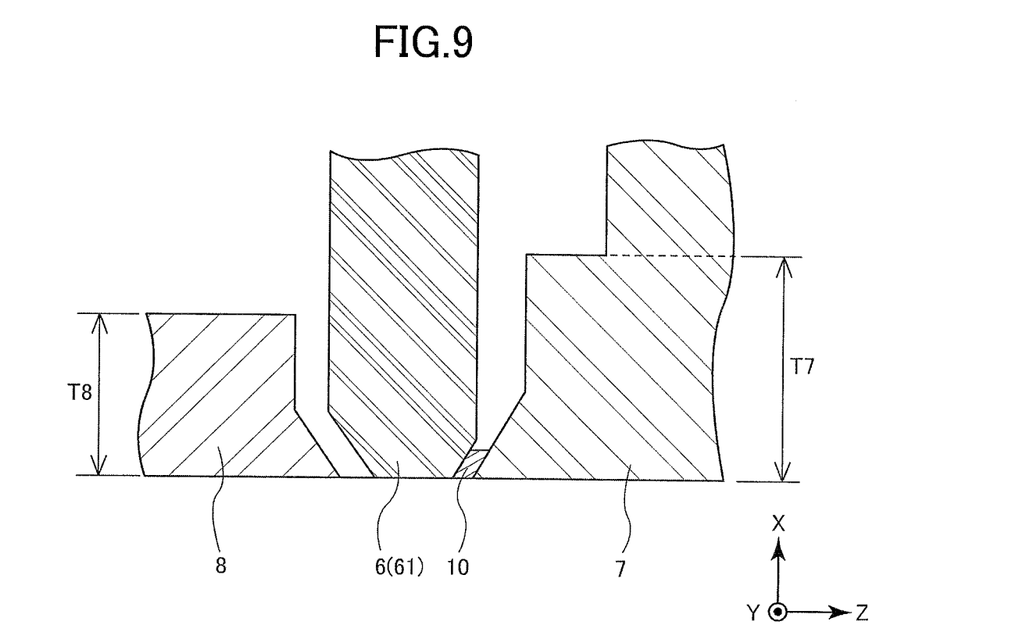
FIG. 9 a partially-enlarged cross-sectional view showing a schematic configuration of the recording head in the microwave assisted magnetic head in the vicinity of ABS in one embodiment of the present invention.

As shown in FIG. 9, the upper-side (+Z side) end surface positioned in the vicinity of the ABS 70 and the lower-side (−Z side) end surface are configured to be tapered so as to gradually reduce the thickness of the main magnetic pole part 61 (thickness in the Z direction) toward the ABS 70. With this design, recording magnetic flux emitted from the main magnetic pole part 61 (first magnetic pole part 611) can be further focused on the ABS 70.

The STO 10 (see FIG. 1), as a multilayer element including the base multilayer body 11 relating to the present embodiment, is provided in the gap (write gap) between the main magnetic pole part 61 and the trailing shield 7. The STO 10 is provided in the write gap to allow the base multilayer body 11 (see FIG. 1) to be adjacent to the main magnetic pole part 61, and to allow the cap layer 15 (see FIG. 1) to be adjacent to the trailing shield 7. In the present embodiment, it becomes possible to narrow the write gap because the base multilayer body 11 of the STO 10 is thinner. The write gap can be set, for example, at approximately 15 nm to 40 nm.

The trailing shield 7 and the leading shield 8 have a function to incorporate a recording magnetic flux that is emitted and scatters from the main magnetic pole part 61. The trailing shield 7 has reached the ABS 70, and fulfills a role as a magnetic guide path of the magnetic flux that is returned from the soft magnetic under layer disposed under the recording layer (perpendicular magnetic layer) of the magnetic disk 100. Thicknesses T7 and T8 (minimum thicknesses in the height direction in a portion facing the ABS 70) (see FIG. 9) of the trailing shield 7 and the leading shield 8 can be set at, for example, approximately 0.05 μm to 1 μm. The trailing shield 7 and the leading shield 8 can be made from NiFe (permalloy) or iron-based alloy materials or the like similar to the main magnetic pole layer 6.

At the rear side from the ABS in the height direction, a first back gap layer 7b formed with an insulating body that electrically insulates the main magnetic pole layer 6 and the trailing shield 7 is arranged between them, and a second back gap layer 8b formed with an insulating body that electrically insulates the main magnetic pole layer 6 and the leading shield 8 is arranged between them.

First coils 9a and second coils 9b are for generating a magnetic flux for magnetic recording to the magnetic disk 100, and are configured by, for example, a highly conductive material, such as copper (Cu). The first coil 9a and the second coil 9b have a wound structure (spiral structure) that are wound centering on linkage parts 7a and 8a, the first back gap layer 7b and the second back gap layer 8b, respectively. The first coil 9a and the second coil 9b are configured to be a two-turn loop shape continuing from one end to the other end, respectively, and have a front turn portion at the nearly upper side of insulating layers IL1 and IL2, respectively.

A nonmagnetic layer NML is provided in a part at a back side in the height direction from the front turn parts of the first coil 9a and the second coil part 9b, via an insulating layer IL3, respectively. This nonmagnetic layer NML is continuously provided on the trailing shield 7, and reaches the ABS 70. The nonmagnetic layer NML primarily functions as a protective layer.

Furthermore, in the present embodiment, the number of turns of the first coil 9a and the second coil 9b is two, respectively, but the present invention is not limited to this mode and can be appropriately set within the range of one to four turns.

The first coil 9a and the second coil 9b have a plurality of turns, and it is desired that an insulating layer IL4 of a dry film is implanted in a wound coil crevice. It is preferable that the insulating layer IL4 of a dry film is configured by a material, such as alumina film-formed using a so-called chemical vapor deposition (CVD) method. In order to assuredly fill and form the insulating layer IL4 of a dry film in the coil crevice, a coil shape is particularly important, and it is particularly desirable that the coil is not an inverse tapered shape in the depth direction.

In the present embodiment, the main magnetic pole layer 6 (main magnetic pole part 61) and the trailing shield 7 are connected to a drive current circuit (power circuit) 90 for applying a drive current (direct current) $I_{op}$ to the STO 10 via terminals 91 and 92, respectively. The drive current (direct current) $I_{op}$ to be supplied from the drive current circuit 90 flows to the main magnetic pole layer 6 (main magnetic pole part 61), the STO 10 and the trailing shield 7 in respective order.

Because the drive current $I_{OP}$ flows, electrons are spin-polarized due to the magnetization of the SIL 12. If the spin polarization of the SIL 12 is positive, spin electrons that have been polarized to a reverse direction from the majority spins of the SIL 12 are reflected at the SIL [12] and are injected into the FGL 14. Because the reflected spin electrons function so as to counteract the dumping of the magnetization of the FGL 14, the precession movement of the magnetization of the FGL 14 is induced, and a microwave magnetic field is generated from the FGL 14. Signals can be recorded onto the magnetic disk 100 with great uniaxial magnetic anisotropy energy Ku by superimposing this microwave magnetic field to the recording field from the main magnetic pole layer 6.

Furthermore, depending upon the layer configuration of the STO 10, the generation mechanism of the microwave magnetic field and the like, the drive current $I_{OP}$ may flow into the trailing shield 7, the STO 10 and the main magnetic pole layer 6 (main magnetic pole part 61) in respective order.

In the microwave assisted magnetic head 1 in the present embodiment having the configuration above, the STO 10 as a recording element in the recording head 1B includes the base multilayer body 11 relating to the present embodiment, and it is possible to reduce the film thickness, and superior magnetic characteristics can be provided. Therefore, according to the microwave assisted magnetic head 1 in the present embodiment, the gap (write gap) between the main magnetic pole layer 6 (main magnetic pole part 61) and the trailing shield 7 can be narrowed, and high recording density can be accomplished.

Further, in the microwave assisted magnetic head 1 in the present embodiment, since the gap (read gap) between the upper shield layer 5 and the lower shield layer 3 can be narrowed by using the STO 10 or the MR element 20 as a reproducing element in the reducing head 1A, the signals recorded in the magnetic disk 100 can be read at high resolution.

The embodiment explained above was described to facilitate the understanding of the present invention, but it is not described to restrict the present invention. Therefore, each element disclosed in the embodiment is a concept including all design changes and equivalents in the technical scope of the present invention.

In the embodiment above, the mode where the SIL 12, the nonmagnetic spacer layer 13, the FGL 14 and the cap layer 15 are laminated on the base multilayer body 11 of the STO 10 in respective order was explained as an example, but the present invention should not be limited to such a mode. For example, in the STO 10 in the present embodiment, the FGL 14, the nonmagnetic spacer layer 13, the SIL 12 and the cap layer 15 may be laminated on the base multilayer body 11 in respective order. In this case, the direction where a current flows in the STO 10 may be a direction toward the base multilayer body 11 side from the cap layer 15 side, and may be a direction toward the cap layer 15 side from the base multilayer body 11 side. In the former case, the spin electrons that have been polarized to the inverse direction from the majority spins of the SIL 12 are reflected at the SIL 12 and are injected into the FGL 14. Because these reflected spin electrons function so as to counteract the dumping of the magnetization of the FGL 14, the precession movement of the magnetization of the FGL 14 is induced, and a microwave magnetic field is generated from the FGL 14. In the meantime, in the latter case, the spin electrons that have been polarized to the inverse direction from the majority spin of the SIL 12 injected into the FGL 14 from the SIL 12 are reflected by/at the FGL 14 and are injected into the SIL 12, the magnetization of the SIL 12 is reversed, and the polarization direction of the spin electrons to be injected to the FGL 14 is also reversed. Because these spin electrons function to counteract the dumping of the magnetization of the FGL 14, the precession movement of the magnetization of the FGL 14 is induced, and a microwave magnetic field is generated from the FGL 14.

In the embodiment above, the mode where the free layer 21, the nonmagnetic spacer layer 22, the reference layer 23, the nonmagnetic metal layer 26, the pinned layer 24 and the cap layer 25 are laminated on the base multilayer body 11 of the MR element 20 in respective order was explained as an example, but the present invention should not be limited to a such mode. For example, in the MR element 20 in the present embodiment, the pinned layer 24, the nonmagnetic metal layer 26, the reference layer 23, the nonmagnetic spacer layer 22, the free layer 21 and the cap layer 25 may be laminated on the base multilayer body 11 in respective order.

In the embodiment above, the mode where the STO 10 as the multilayer element including the base multilayer body 11 is used as a recording element and a reproducing element of the microwave assisted magnetic head 1, and the mode where the MR element 20 as the multilayer element is used as a reproducing element of the microwave assisted magnetic head 1 were explained as examples, but the present invention is not limited to such modes. For example, the STO 10 and the MR 20 in the embodiment above may be applied to a reference clock in a portable electronic device or the like, or an electronic circuit using a microwave, such as a frequency converter element, in a wireless communication transmitter, a wireless transmitter receiver or the like, and may be applied to a magnetic random access memory (MRAM) or the like.

EXAMPLES

Hereafter, the present invention is explained in further detail with examples, but the present invention is not limited by the examples below.

Example 1

After a TaFe alloy layer (Ta:Fe=27 (at %):73 (at %)) with a film thickness of 10 Å was formed as a seed layer on a silicon wafer using a sputtering method, an IrCr alloy layer with a film thickness of 20 Å was formed as a buffer layer using the sputtering method; thereby, a base multilayer body (total film thickness: 30 Å) was produced. $[CoFe/Ni]_{20}$ was formed as a spin injection layer (SIL) on the buffer layer of the base multilayer body using the sputtering method, and a multilayer Le1 was produced.

Example 2

The base multilayer body was produced in a manner similar to Example 1 except that the TaCo alloy layer (Ta:Co=27 (at %):73 (at %)) with a film thickness of 10 Å was formed as a seed layer, $[CoFe/Ni]_{20}$ was formed on the buffer layer of the base multilayer body as the SIL using the sputtering method, and a multilayer Le2 was produced.

Example 3

The base multilayer body was produced in a manner similar to Example 1 except that the TaNi alloy layer (Ta:Ni=27 (at %):73 (at %)) was formed, $[CoFe/Ni]_{20}$ was formed on the buffer layer of the base multilayer body as the SIL using the sputtering method, and a multilayer Le3 was produced.

Comparative Example 1

The base multilayer body (total film thickness: 40 Å) was produced in a manner similar to Example 1 except that a Ta layer with a film thickness of 20 Å was formed as a seed layer and that a Cu layer with film thickness of 20 Å was formed as a buffer layer, [CoFe/Ni]$_{20}$ was formed on the buffer layer of the base multilayer body as the SIL using the sputtering method, and a multilayer Lce1 was produced.

Comparative Example 2

The base multilayer body (total film thickness: 30 Å) was produced in a manner similar to Example 1 except that a Ta layer with film thickness of 10 Å was formed as a seed layer, [CoFe/Ni]$_{20}$ was formed on the buffer layer of the base multilayer body as the SIL using the sputtering method, and a multilayer Lce2 was produced.

Comparative Example 3

The base multilayer body (total film thickness: 35 Å) was produced in a manner similar to Comparative Example 2 except that the film thickness of the IrCr alloy layer as a buffer layer was adjusted at 25 Å, [CoFe/Ni]$_{20}$ was formed on the buffer layer of the base multilayer body as the SIL using the sputtering method, and a multilayer Lce3 was produced.

Comparative Example 4

The base multilayer body (total film thickness: 30 Å) was produced in a manner similar to Comparative Example 1 except that the film thickness of the Ta layer as a seed layer was adjusted at 10 Å, [CoFe/M]$_{20}$ was formed on the buffer layer of the base multilayer body as the SIL using the sputtering method, and a multilayer Lce4 was produced.

Comparative Example 5

The base multilayer body (total film thickness: 30 Å) was produced in a manner similar to Comparative Example 1 except that the film thickness of the Cu layer as a buffer layer was adjusted at 10 Å, [CoFe/M]$_{20}$ was formed on the buffer layer of the base multilayer body as the SIL using the sputtering method, and a multilayer Lce5 was produced.

Test Example 1

Effective perpendicular magnetic anisotropy energy Keff (erg/cm$^3$) of the spin injection layer (SIL) in the multilayers Le1 to Le3 and Lce1 to Lce5 of Examples 1 to 3 and Comparative Examples 1 to 5 were measured using a magnetic torque meter (product name: high-sensitive magnetic crystalline anisotropy torque meter TM-TR1550-HGC, manufactured by Tamakawa Co., Ltd.). In addition, saturation magnetization Ms (emu/cm$^3$) was calculated using a vibrating sample magnetometer (BH-V Series, manufactured by Riken Denshi Co., Ltd.), and perpendicular magnetic anisotropy energy Ku (erg/cm$^3$) of the SIL was calculated from a relational expression of Ku=Keff+2πMs$^2$. Results are shown in FIG. 10.

Figure 10:
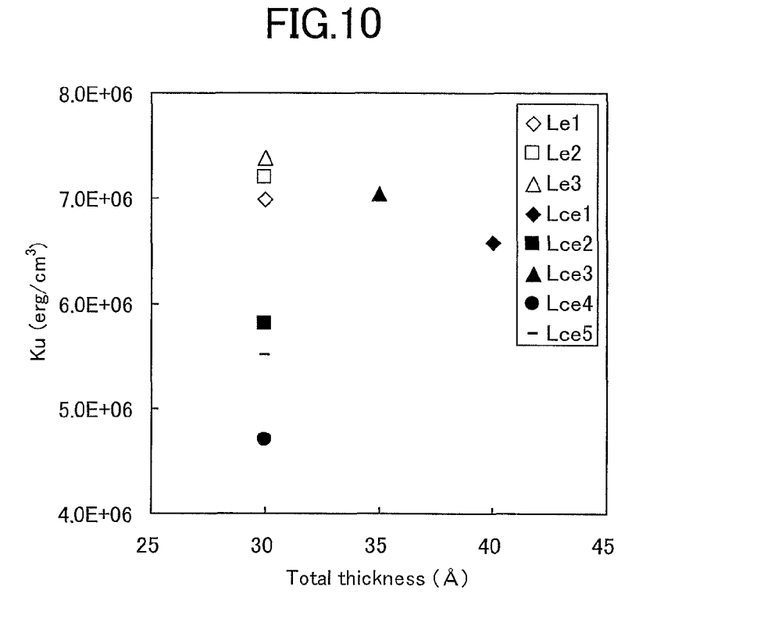
FIG. 10 is a graph showing results of Test Example 1.

FIG. 10 is a graph showing calculation results of the perpendicular magnetic anisotropy energy Ku in each multilayer of Examples 1 to 3 and Comparative Examples 1 to 5. In the graph, the horizontal axis indicates total thickness (Å) of the base multilayer body, and the vertical axis indicates perpendicular magnetic anisotropy energy Ku (erg/cm$^3$) of the SIL.

According to the graph shown in FIG. 10, in the base multilayer bodies of each multilayer in Examples 1 to 3, it was confirmed that the higher perpendicular magnetic anisotropy could be induced to the SIL compared to the base multilayer bodies of each multilayer in Comparative Examples 1 to 5. In the meantime, in Comparative Examples 2, 4 and 5 having the base multilayer body with the same total film thickness as the base multilayer bodies in Examples 1 to 3, it was confirmed that the perpendicular magnetic anisotropy energy Ku of the SIL was low. Further, according to the results of Comparative Examples 2 and 3, it was confirmed that it would be necessary to thicken the total film thickness of the base multilayer body in order to increase the perpendicular magnetic anisotropy energy Ku of the SIL. In addition, according to the results of Comparative Examples 1, 4 and 5, if both the seed layer and the buffer layer are configured by a metal single layer, in order to increase the perpendicular magnetic anisotropy energy Ku of the SIL, it is necessary to thicken the total film thickness of the base multilayer body. However, if the seed layer is configured by an alloy layer with Ta and 3d transition metal as in Examples 1 to 3 and the buffer layer is configured by an alloy layer containing the group VI metal and the group IX metal in the periodic table having a [001] plane orientation hexagonal close-packed structure, it was confirmed that the desired perpendicular magnetic anisotropy could be induced to the SIL even if the total film thickness of the base multilayer body was reduced.

From the results, according to the base multilayer body including an alloy layer (seed layer) of Ta and 3d transition metals and an alloy layer (buffer layer) containing the group VI metal and the group IX metal in the periodic table having the [001] plane orientation hexagonal close-packed structure, it is believed that the base multilayer body can be thinner, and desired magnetic characteristics can be demonstrated in a magnetic layer to be formed on the base multilayer body.

Text Example 2

In each of Examples 1 to 3, the multilayer where a compositional ratio of Fe, Co and Ni (3d transition metals) in the seed layer 11a fluctuated was produced, and the perpendicular magnetic anisotropy energy Ku (erg/cm$^3$) of the SIL in each multilayer was measured in a manner similar to Test Example 1. The results are shown in FIG. 11.

Figure 11:
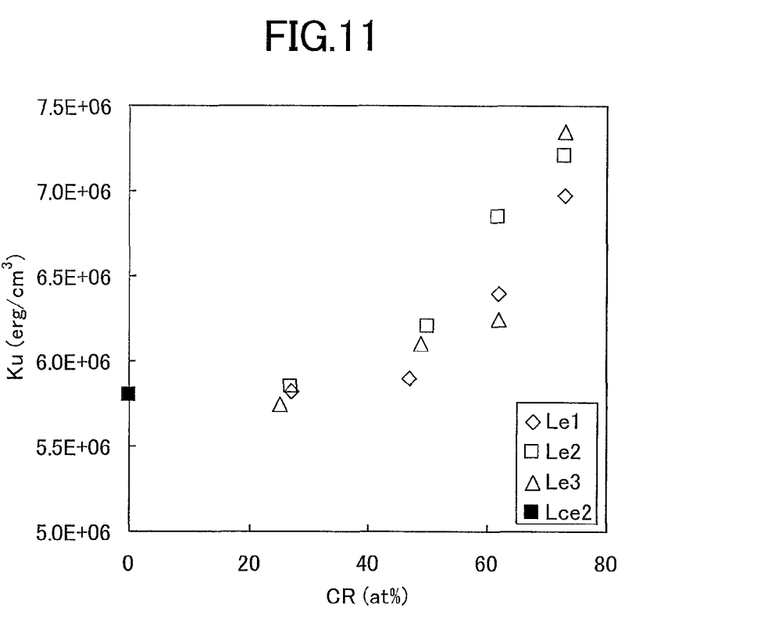
FIG. 11 is a graph showing results of Test Example 2.

In the graph shown in FIG. 11, the horizontal axis indicates a compositional ratio CR (at %) of Fe, Co and Ni in the alloy layer configuring the seed layer, and the vertical axis indicates the perpendicular magnetic anisotropy energy Ku(erg/cm$^3$) of the SIL.

According to the graph shown in FIG. 11, in each multilayer of Examples 1 to 3, it was confirmed that the perpendicular magnetic anisotropy energy Ku of SIL could be increased by adjusting the compositional ratio of the 3d transition metals (such as Fe, Co or Ni) at 40 at % or greater and the compositional ratio of Ta at 60 at % or less.

The invention claimed is:
1. A base multilayer body including a seed layer and a buffer layer laminated in respective order, wherein
the seed layer is an alloy layer that includes tantalum (Ta) and at least one type of other metal, and that has an amorphous structure or a microcrystal structure, and
the buffer layer is an alloy layer that has a [001] plane orientation hexagonal close-packed structure and that includes at least one type of a group VI metal and at least one type of a group IX metal in the periodic table.

2. The base multilayer body according to claim 1, wherein the seed layer is an alloy layer including tantalum (Ta) and at least one type of metal selected from a group of V, Ti, Cr, Mn, Fe, Co, Ni and Cu.

3. The base multilayer body according to claim 1, wherein the seed layer is an alloy layer including tantalum (Ta), and Fe, Co or Ni.

4. The base multilayer body according to claim 1, wherein the seed layer is an alloy layer including 60 at % or less of tantalum (Ta).

5. The base multilayer body according to claim 1, wherein the buffer layer is an alloy layer including Cr as the group VI metal and Rh or Ir as the group IX metal.

6. The base multilayer body according to claim 1, wherein the buffer layer includes 30 at % or greater of the group VI metal(s) and 30 at % or greater of the group IX metal(s).

7. A multilayer element, comprising the base multilayer body according to claim 1, a first ferromagnetic layer, a second ferromagnetic layer and a nonmagnetic spacer layer, wherein the first ferromagnetic layer, the nonmagnetic spacer layer and the second ferromagnetic layer are laminated on the buffer layer in respective order.

8. The multilayer element according to claim 7, wherein either the first ferromagnetic layer or the second ferromagnetic layer is a spin injection layer, and the other of either the first ferromagnetic layer or the second ferromagnetic layer is a magnetic field generation layer.

9. A microwave assisted magnetic head, comprising:
a main magnetic pole that generates a recording magnetic field to be applied to a magnetic recording medium,
a trailing shield that forms a magnetic path with the main magnetic pole, and
the multilayer element according to claim 8 that is provided in a write gap between the main magnetic pole and the trailing shield.

10. The multilayer element according to claim 7, wherein either the first ferromagnetic layer or the second ferromagnetic layer is a free layer having a magnetization direction that is changed according to an external magnetic field, and the other of either the first ferromagnetic layer or the second ferromagnetic layer is a pinned layer having a pinned magnetization direction.

11. A magnetic sensor, comprising the multilayer element according to claim 7.

* * * * *